July 9, 1929.  E. C. WEISGERBER  1,720,067

BATTERY CLIP

Filed June 15, 1926

INVENTOR.
Edwin C. Weisgerber,
BY
ATTORNEY.

Patented July 9, 1929.

1,720,067

UNITED STATES PATENT OFFICE.

EDWIN C. WEISGERBER, OF LONG BEACH, CALIFORNIA.

BATTERY CLIP.

Application filed June 15, 1926. Serial No. 116,107.

My invention relates to a means for connecting terminals to the electrodes of storage batteries, and it has especial reference to a simple and cheap device which may be easily applied to and removed from battery electrodes and to which terminals of apparatus using the battery energy may be conveniently attached.

The objects of the invention are to provide a battery clip which will establish a firm and solid connection with the electrodes; which will form a tight joint, with economy of space; will provide a maximum contacting surface; and will be unaffected in its firm and solid grip, by the accumulations of salts.

These and other objects are accomplished by the device shown in the accompanying drawing, which are forms of the invention which I prefer to use.

Throughout the specification and drawings like reference numerals indicate like parts.

Figure 3:
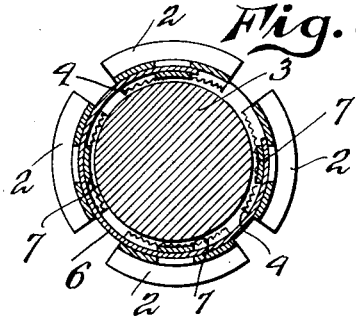
Fig. 3 is a sectional plan view on line 3—3, Fig. 1.

My invention comprises a flat metallic body 1 formed with spaced prehensile, resilient members 2 which are arranged to grip an electrode 3 or other element. These members 2 constitute integral portions of the metallic body 1 and extend at substanially right-angles to the plane of the body. The extreme ends of each of the members is provided with inwardly extending serrations 4, by which a firm and strong engagement of them with an object is insured and a perfect contact provided. The plane metallic body may be provided with a binding post 5 or other device to which a terminal may be conveniently applied. While ordinarily the resiliency of the members 2 is sufficient to insure a tight hold thereof upon an object, I prefer to place them under a tension whereby they are held in relative yielding position during the application of the clip to an object, the tension means under which the members are placed, operating to resist the outward movement of the members during such application and thereby increasing the grip thereof upon the object. A convenient means for thus placing and holding the members under tension is shown in Fig. 3, as comprising a circular spring 6, which may be in the form of a strip of spring steel, which is arranged to be carried in any convenient manner by the members 2, as by supports 7, formed or provided on said members. By means of this spring 6, the members 2 are normally drawn toward one another thereby causing the serrations 4 firmly to engage the electrode or other object. I have shown a binding post 5 associated with the plane of the metallic member, but this post 5 may be positioned in any other place where suggested by convenience or necessary because of lack of space.

Figure 1:
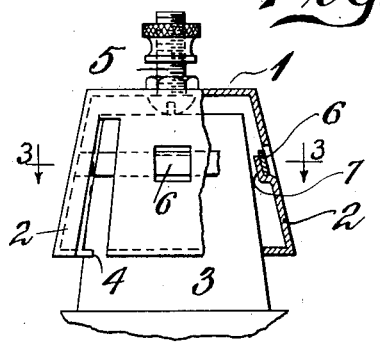
Fig. 1 is a front view showing my invention as applied to an electrode of a battery.
Figure 2:
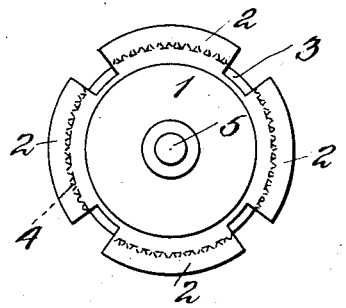
Fig. 2 is a plan view.
Figure 4:
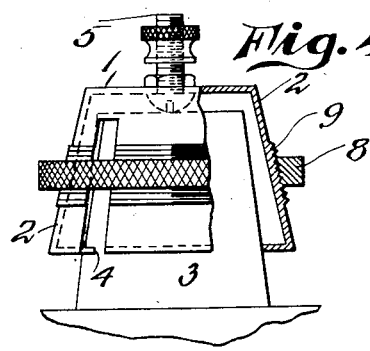
Fig. 4 is a front view showing a slightly modified form of the invention.
Figure 5:
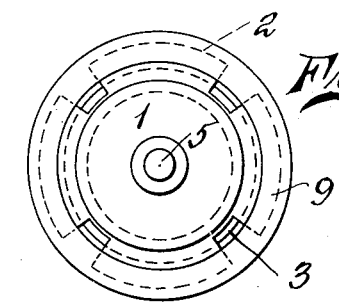
Fig. 5 is a plan view.
Figure 6:
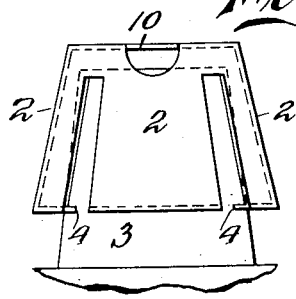
Fig. 6 is a side view of another modified form.
Figure 7:
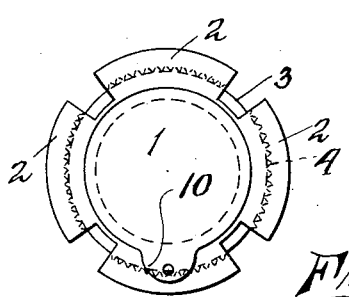
Fig. 7 is a plan view.

In Figs. 4 and 5, I have shown a form of battery or electrode clip slightly modified from that shown in Figs. 1, 2 and 3 and embodying a different means for forcing inwardly the resilient prehensile members 2. This means consists of an annular nut 8, which is internally threaded and arranged for threaded engagement with the members 2, which are externally threaded, as seen at 9. By manipulation of this nut 8, the engagement of the serrated parts of the members 2 with an object may be increased or lessened, as needed. The members 2, however, of the clip may be made strong enough to require no complementary adjunct or device for forcing them upon an object. Such a form of the device is illustrated in Figs. 6 and 7. An ear 10, may be provided on one of the members, and this ear may be apertured to receive a wire or any means for fastening thereto a wire, as a binding screw.

What I claim, is:

1. A battery clip comprising a flat topped body having a plurality of spaced members extending substantially at right angles to the top thereof and provided at the respective ends thereof with inwardly extending serrations arranged for engagement with a battery post, supporting means on the inside of said members, and a spring on said supporting means to maintain said members under tension.

2. A battery clip comprising a cup-shaped body arranged to fit over a battery post and provided with a plurality of spaced members, the ends of which are inwardly bent and serrated to grip a battery post, each of said members provided with inwardly extending supports, and a spring carried by said supports to maintain said members in tension and cause the serrated ends thereof to grip the battery post.

In testimony whereof I have set my hand.
EDWIN C. WEISGERBER.